(12) United States Patent
DeWitte et al.

(10) Patent No.: US 12,394,531 B2
(45) Date of Patent: Aug. 19, 2025

(54) REACTOR BUILDING AND VESSEL SYSTEMS

(71) Applicant: OKLO, INC., Sunnyvale, CA (US)

(72) Inventors: Jacob DeWitte, Mountain View, CA (US); Caroline Cochran, Mountain View, CA (US); Nathan Graff, Sunnyvale, CA (US); Patrick Everett, San Francisco, CA (US); Joshua G. Richard, Sunnyvale, CA (US); Alex Renner, Silverthorne, CO (US); David Hawn, Houston, TX (US); John Hanson, Sunnyvale, CA (US)

(73) Assignee: Oklo Inc., Santa Clara, CA (US)

( * ) Notice: Subject to any disclaimer, the term of this patent is extended or adjusted under 35 U.S.C. 154(b) by 306 days.

(21) Appl. No.: 17/905,987

(22) PCT Filed: Mar. 8, 2021

(86) PCT No.: PCT/US2021/021394
§ 371 (c)(1),
(2) Date: Sep. 9, 2022

(87) PCT Pub. No.: WO2021/183452
PCT Pub. Date: Sep. 16, 2021

(65) Prior Publication Data
US 2023/0102811 A1 Mar. 30, 2023

Related U.S. Application Data

(60) Provisional application No. 62/987,705, filed on Mar. 10, 2020, provisional application No. 62/987,115, filed on Mar. 9, 2020.

(51) Int. Cl.
*G21C 13/10* (2006.01)
*G21C 11/02* (2006.01)
(Continued)

(52) U.S. Cl.
CPC ........... *G21C 13/10* (2013.01); *G21C 11/026* (2013.01); *G21C 13/024* (2013.01);
(Continued)

(58) Field of Classification Search
CPC ...................................................... G21C 13/10
See application file for complete search history.

(56) References Cited

U.S. PATENT DOCUMENTS 3,716,097 A * 2/1973 Kelp ..................... F28B 1/06
165/111
4,508,677 A * 4/1985 Craig ..................... G21C 1/322
376/245
(Continued)

FOREIGN PATENT DOCUMENTS

CN 209345053 U * 9/2019
DE 2928765 2/1981
(Continued)

OTHER PUBLICATIONS

Oklo Part II: Final Safety Analysis Report. p. 87 excerpted. <www.nrc.gov/docs/ML2007/ML20075A003.pdf>. (Year: 2020).*
(Continued)

*Primary Examiner* — Lily C Garner
(74) *Attorney, Agent, or Firm* — Fish & Richardson P.C.

(57) ABSTRACT

Reactor buildings and vessel systems are disclosed. A nuclear power system includes: a building structure that comprises at least two exterior side walls and two end walls, at least one of the exterior walls angled non-orthogonally relative to a floor of the building structure, the at least two exterior walls and two end walls defining an interior volume of the building structure; one or more nuclear reactor systems mounted at least partially in the interior volume of the building structure; and one or more heat exchanger systems mounted at least partially to at least one of the
(Continued)

exterior walls. A nuclear reactor vessel system includes: a nuclear fission reactor; an inner vessel that defines an inner volume sized to at least partially enclose the nuclear fission reactor; and an outer vessel sized to wholly or substantially enclose the inner vessel, the inner vessel being removable from the outer vessel.

22 Claims, 9 Drawing Sheets

(51) Int. Cl.
  *G21C 13/024*    (2006.01)
  *G21C 13/028*    (2006.01)
  *G21C 13/093*    (2006.01)
  *G21C 15/253*    (2006.01)
  *G21C 15/257*    (2006.01)
  *G21D 1/02*    (2006.01)
  *H02S 10/00*    (2014.01)

(52) U.S. Cl.
  CPC ......... *G21C 13/028* (2013.01); *G21C 13/093* (2013.01); *G21C 15/253* (2013.01); *G21C 15/257* (2013.01); *G21D 1/02* (2013.01); *H02S 10/00* (2013.01)

(56) References Cited

U.S. PATENT DOCUMENTS

| | | | | |
|---|---|---|---|---|
| 4,863,675 | A * | 9/1989 | Yampolsky | G21D 1/00 376/905 |
| 10,030,913 | B1 * | 7/2018 | Cao | F28D 15/0275 |
| 10,043,596 | B2 * | 8/2018 | Kwon | G21C 15/18 |
| 10,692,611 | B2 * | 6/2020 | DeWitte | G21C 7/02 |
| 11,204,201 | B2 * | 12/2021 | Singh | F28D 1/05308 |
| 2002/0005176 | A1 * | 1/2002 | Bensing | B01D 5/0018 122/459 |
| 2014/0124355 | A1 * | 5/2014 | Lakic | F03G 7/04 165/104.31 |
| 2015/0316038 | A1 * | 11/2015 | Petrovich | G21D 1/00 60/698 |
| 2017/0051981 | A1 * | 2/2017 | Singh | F28B 9/06 |
| 2017/0249999 | A1 * | 8/2017 | DeWitte | G21C 7/02 |
| 2018/0226159 | A1 * | 8/2018 | Sterbentz | G21C 3/626 |
| 2020/0027589 | A1 * | 1/2020 | Singh | G21C 9/02 |
| 2021/0098143 | A1 * | 4/2021 | Trojer | G21C 5/10 |
| 2021/0210242 | A1 * | 7/2021 | Singh | F28D 1/0443 |
| 2024/0068749 | A1 * | 2/2024 | Singh | G21C 19/07 |

FOREIGN PATENT DOCUMENTS

| | | |
|---|---|---|
| DE | 2928765 A1 * | 2/1981 |
| EP | 0179572 | 4/1986 |

OTHER PUBLICATIONS

Office Action in Canadian Appln. No. 3171077, dated Nov. 6, 2023, 3 pages.

International Search Report and Written Opinion in related International Application No. PCT/US2021/021394, dated Oct. 11, 2021, 13 pages.

International Preliminary Report on Patentability in International Appln. No. PCT/US2021/021394, mailed on Sep. 22, 2022, 10 pages.

MorningConsult.com [online], "Advanced Reactor Developer Oklo Receives Site Use Permit From Energy Department," Dec. 10, 2019, retrieved from URL <https://morningconsult.com/2019/12/10/advanced-reactor-developer-oklo-receives-site-use-permit-from-energy-department/>, 6 pages.

* cited by examiner

REACTOR BUILDING AND VESSEL SYSTEMS

CROSS-REFERENCE TO RELATED APPLICATIONS

This application claims the benefit under 35 U.S.C. § 119 of U.S. Provisional Patent Application Ser. No. 62/987,115 filed Mar. 9, 2020, and U.S. Provisional Patent Application Ser. No. 62/987,705 filed Mar. 10, 2020, which are incorporated herein by reference in their entirety.

TECHNICAL FIELD

The present disclosure relates generally to nuclear reactors, and more specifically to small reactors.

BACKGROUND

Global energy growth and a drive to reduce pollution and emissions is stimulating new activity around the commercialization and design of new reactor technologies. Some of these technologies include small reactors designed to provide long lasting and resilient power in a more distributed fashion.

SUMMARY

Reactor fuel and cooling designs can be integrated in fashions such that cooling, fuel, shielding, structure, instrumentation, refueling systems, and other functional systems can be integrated to create modular systems to enable enhanced economic performance.

According to some implementations, a fission reactor includes fuel including a fissile material such as uranium-233, uranium-235, or plutonium-239; a coolant or cooling device, a heat exchanger to transfer the heat from the coolant or cooling device to a power conversion system, as well as instrumentation, supporting structures and shielding.

According to some implementations, these structures, systems, and components are housed in buildings that provide structural support and shielding from environmental conditions.

According to some implementations, these buildings can take the shape of an A-frame structure, which adds certain functionality to its design, such as: precipitation management, simplified construction, supports for solar panels, structural supports for the building and equipment in the building, favorable heat transfer characteristics due to the arrangement of the building which promotes natural circulation and natural convection of the gases, such as air, in the building to enhance heat transfer to the environment, and structural support for radiator panels that reject waste heat to the environment.

According to some implementations, an A-frame building can include access doors for equipment installation, service, and replacement.

In an example implementation, an A-frame building for housing a nuclear reactor system includes a first side and a second side each having a bottom edge resting on a ground surface and a top edge opposite the bottom edge. The ground surface defines a ground plane; the first side defines a first plane at an acute angle relative to the ground plane; the second side defines a second plane at an acute angle relative to the ground plane; and the respective top edges of the first side and the second side meet to form an apex. The A-frame building includes an inside defined by a volume between the first plane, the second plane, and the ground plane. The A-frame building includes a heat removal system configured to conduct heat from one or more nuclear reactor systems positioned in the A-frame building across the first side, the second side, or both.

In an aspect combinable with the example implementation, the heat removal system includes a radiator system installed on one or more of the first side and the second side.

In another aspect combinable with any of the previous aspects, the radiator system includes one or more radiator panels, each radiator panel including one or more radiator tubes.

In another aspect combinable with any of the previous aspect, the heat removal system includes one or more fans for directing air heated by the one or more nuclear reactor systems toward the radiator system.

In another aspect combinable with any of the previous aspects, the heat removal system is configured to control a temperature of the inside by conducting heat generated by the one or more nuclear reactor systems across the first side, the second side, or both.

Another aspect combinable with any of the previous aspects further includes a solar panel system installed on one or more of the first side or the second side. The solar panel system is configured to generate electrical power for the one or more nuclear reactor systems.

Another aspect combinable with any of the previous aspects further includes a plurality of A-frame beams supporting the first side and the second side. The A-frame beams are configured to support lifting equipment.

In another aspect combinable with any of the previous aspects, the lifting equipment includes one or more cranes.

In another aspect combinable with any of the previous aspects, the top edges of the first side and the second side are longer than the respective bottom edges of the first side and the second side.

In another example implementation, a nuclear power system includes a building structure that includes at least two exterior side walls and two end walls, at least one of the exterior walls angled non-orthogonally relative to a floor of the building structure, the at least two exterior walls and two end walls defining an interior volume of the building structure; one or more nuclear reactor systems mounted at least partially in the interior volume of the building structure; and one or more heat exchanger systems mounted at least partially to at least one of the exterior walls and in thermal communication with the one or more nuclear reactor systems.

In an aspect combinable with the example implementation, both of the at least two exterior walls are angled non-orthogonally relative to the floor of the building structure.

In another aspect combinable with any of the previous aspects, the at least two exterior walls converge at a top apex of the building structure, and diverge at the floor of the building structure.

In another aspect combinable with any of the previous aspects, the one or more heat exchanger systems include one or more air-cooled radiator systems.

Another aspect combinable with any of the previous aspects further includes a control system communicably coupled to at least one of the one or more heat exchangers systems or the one or more nuclear reactor systems.

In another aspect combinable with any of the previous aspects, the control system is configured to operate at least one of the one or more heat exchanger systems or the one or more nuclear reactor systems to modulate an amount of heat transferred from the one or more nuclear reactor systems to the one or more heat exchanger systems.

In another aspect combinable with any of the previous aspects, the one or more heat exchanger systems include one or more fans for directing air heated by the one or more nuclear reactor systems toward the one or more air-cooled radiator systems.

Another aspect combinable with any of the previous aspects further includes a solar panel system installed on one or more of the at least two exterior side walls. The solar panel system is configured to generate electrical power for the one or more nuclear reactor systems.

Another aspect combinable with any of the previous aspects further includes a plurality of beams supporting the at least two exterior side walls. The beams are configured to support lifting equipment.

In another aspect combinable with any of the previous aspects, the lifting equipment includes one or more cranes.

In another aspect combinable with any of the previous aspects, edges of the at least two exterior side walls at the top of the building structure are longer than edges of the exterior side walls at the floor of the building structure.

In another example implementation, a method of operating a nuclear power system includes operating one or more nuclear reactor systems at least partially positioned in an interior volume of a building structure to generate electric power. The building structure includes at least two exterior side walls and two end walls, with at least one of the exterior walls angled non-orthogonally relative to a floor of the building structure, the at least two exterior walls and two end walls defining the interior volume. The method includes generating heat through the operation of the one or more nuclear reactor systems; and transferring at least a portion of the generated heat to one or more heat exchanger systems mounted on at least one of the exterior side walls of the building structure.

In an aspect combinable with the example implementation, both of the at least two exterior side walls are angled non-orthogonally relative to the floor of the building structure.

In another aspect combinable with any of the previous aspects, the at least two exterior walls converge at a top of the building structure, and diverge at the floor of the building structure.

In another aspect combinable with any of the previous aspects, the one or more heat exchanger systems include one or more air-cooled radiator systems.

Another aspect combinable with any of the previous aspects further includes operating, by a control system, at least one of the one or more heat exchangers systems or the one or more nuclear reactor systems to modulate an amount of heat transferred from the one or more nuclear reactor systems to the one or more heat exchanger systems.

In another aspect combinable with any of the previous aspects, the one or more heat exchanger systems include one or more fans for directing air heated by the one or more nuclear reactor systems toward the one or more air-cooled radiator systems.

According to some implementations the fissile material can be contained in fuel cells. The fuel cells can be held inside a reactor module.

According to some implementations, the transfer of heat from the fuel to the heat exchanger through the heat pipe is accomplished by using the fuel in direct thermal communication with the heat pipe, or with one or more intermediate layers between fuel and heat pipe.

According to some implementations, the fuel can also be held in tubes, like cladding tubes, and the heat is transferred to a coolant.

According to some implementations, the coolant or heat pipe carries heat to a heat exchanger (which is part of an electrical power generation system, such as Rankine cycle power generator system) where it transfers its heat to another coolant or working fluid.

According to some implementations, these structures are supported and contained in a vessel-like structure.

According to some implementations, this vessel, along with what is inside it, is placed inside another vessel-like structure. This second containing structure is sized to accommodate the inner structure, and can be sized to accommodate other structures, such as reinforcing structures, shielding, detectors, structures that enhance heat transport, among other structures.

According to some implementations, these nested structures provide structural support, configuration flexibility to accommodate other materials and structures, as well as multiple barriers to the leakage of materials contained within the structures, such as gases and liquids.

According to some implementations, these structures also enable a variety of physical mounting, suspension, and support designs. These can include mounting these vessels on steel or a reinforced concrete emplacement, which can resemble a silo.

According to some implementations, a gap between the steel and concrete can be present to allow for passive heat removal via radiation or natural convection off the surface of the outer steel container. This gap can also be filled with other fluids or solids to support achieving adequate heat transfer. Examples can include water, sand, or other porous medium.

According to some implementations, these structures can be oriented horizontally to reduce height requirement, or to simplify positioning.

The emplacement for the vessel and structures can be located in a reactor building, including in the basement of the building, or above grade.

According to some implementations, equipment and machinery that supports reactor operations and control, such as the motors and gears that move reactor control elements can be positioned above or next to these containers. This equipment can also be housed in an external housing structure.

According to some implementations, these control elements can be rods containing neutron absorbing materials that are moved into or out of the core to achieve the desired control function. These can be inserted along a number of orientations with the reactor, including parallel or perpendicular to cooling flow paths. These absorbing elements can also have cooling mechanisms embedded in them, such as heat pipes.

According to some implementations, the elements can be driven by motors with gearboxes and electromagnetic latches. In certain cases, the rods can insert by gravity alone. The rods can also have guided slots or dedicated channels to add structural integrity.

According to some implementations, the control element equipment and machinery, as well as the structures containing them can configured to enable modular replacement of components or whole systems and structures. These configurations can also support the modular flexibility of structures or systems in the reactor core, including fuel elements, heat exchangers, support structures, and cooling structures or devices, such as heat pipes.

According to some implementations, the nested vessels can also be configured in such a way that they can be removed, allowing for replacement of otherwise fixed and major parts.

In an example implementation, a nuclear reactor vessel system includes a nuclear fission reactor that includes at least one of a fast reactor, an epithermal reactor, or a thermal reactor; an inner vessel that defines an inner volume sized to at least partially enclose the nuclear fission reactor; and an outer vessel sized to wholly or substantially enclose the inner vessel, the inner vessel being removable from the outer vessel.

In an aspect combinable with the example implementation, the nuclear fission reactor is removable from the inner vessel.

In an aspect combinable with any of the previous aspects, the nuclear fission reactor includes a plurality of nuclear fuel elements.

In another aspect combinable with any of the previous aspects, the nuclear fission reactor includes a plurality of heat pipes.

In another aspect combinable with any of the previous aspects, the plurality of heat pipes are in conductive thermal contact with the plurality of nuclear fuel elements.

In another aspect combinable with any of the previous aspects, each of the heat pipes includes a fluid coolant.

In another aspect combinable with any of the previous aspects, at least a portion of the nuclear fuel elements are at least partially enclosed within a cladding.

In another aspect combinable with any of the previous aspects, the plurality of heat pipes are in thermal communication with at least one heat exchanger that is part of at least one of an electrical power generation system or a heat distribution system.

In another aspect combinable with any of the previous aspects, the nuclear fuel elements are cooled by a fluid coolant, the fluid coolant in thermal communication with the nuclear fuel elements and at least one heat exchanger that is part of at least one of an electrical power generation system or a heat distribution system.

Another aspect combinable with any of the previous aspects further includes radiation shielding in an annulus between the inner and outer vessels.

Another aspect combinable with any of the previous aspects further includes support structure in an annulus between the inner and outer vessels.

Another aspect combinable with any of the previous aspects further includes radiation detectors in an annulus between the inner and outer vessels.

Another aspect combinable with any of the previous aspects further includes a fluid seal in an annulus between the inner and outer vessels.

Another aspect combinable with any of the previous aspects further includes an insulative or heat conductive material in an annulus between the inner and outer vessels.

In another aspect combinable with any of the previous aspects, the insulative or heat conductive material includes at least one of water or sand.

In another aspect combinable with any of the previous aspects, at least one of the inner vessel or outer vessel is configured to couple to a portion of a support structure.

In another aspect combinable with any of the previous aspects, the support structure includes a concrete emplacement formed in or as part of a building structure.

In another aspect combinable with any of the previous aspects, the support structure further includes an engineered backfill between the concrete emplacement and a ground.

In another aspect combinable with any of the previous aspects, the support structure further includes a foundation between the engineered backfill and the ground.

In another aspect combinable with any of the previous aspects, the support structure further includes an insulation layer between the concrete emplacement and the outer vessel.

In another aspect combinable with any of the previous aspects, the insulation layer is positioned in a gap between the concrete emplacement and the outer vessel.

Another aspect combinable with any of the previous aspects further includes a support plate mounted on top of at least one of the inner or outer vessels.

Another aspect combinable with any of the previous aspects further includes at least reactor control assembly mounted within the inner vessel.

In another aspect combinable with any of the previous aspects, the at least reactor control assembly includes a control rod coupled to a motor assembly.

In another aspect combinable with any of the previous aspects, the control rod includes a neutron absorbing material.

In another aspect combinable with any of the previous aspects, the motor assembly includes at least one electromagnet and at least one drive mechanism.

Another example implementation includes a method of operating the nuclear fission reactor of the example implementation of the nuclear reactor vessel system to produce at least one of electrical power or process heat.

DETAILED DESCRIPTION

Small nuclear reactors can be designed to provide long lasting and resilient power in a more distributed fashion. These reactors can be housed in a variety of functional structures.

A nuclear power system can include a structure for housing a nuclear reactor. An example structure for housing a nuclear reactor can be a building in the shape of an A-frame structure. An A-frame structure is an architectural structure with angled sides. A bottom edge of each side can rest on a ground surface, and a top edge of each side can meet at an apex of the building, such that the building forms the shape of the letter "A." An A-frame structure provides certain functionality to the building, such as: structural support, precipitation management, simplified construction, and favorable heat transfer characteristics due to the arrangement of the building which promotes natural circulation and natural convection of gases, such as air, in the building and enhances heat transfer to the environment. The A-frame structure also can provide structural support for air-cooled radiator panels and solar panels that can be installed on the angled sides. The radiator panels can be used to reject waste heat to the environment, while the solar panels can be used to generate electrical power for reactor systems. The A-frame structure can also be used to support equipment in the building, such as a lifting assembly that includes lifting and handling equipment.

Figure 1:
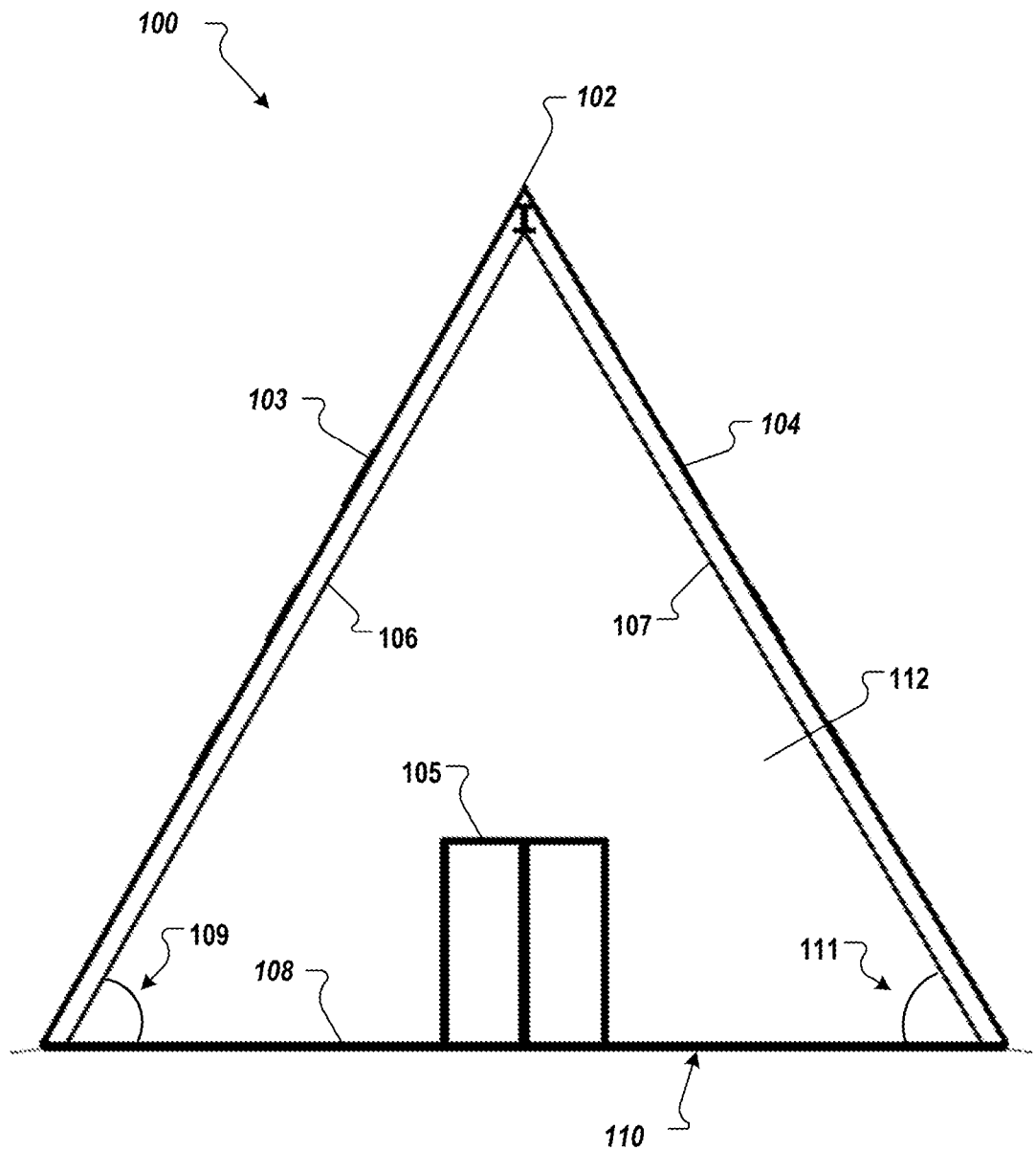
FIG. 1 shows a front view of an example A-frame building.

FIG. 1 shows a front view of an example A-frame building 100. Examples of simplified construction for A-frame buildings are construction through modularity and prefabrication. The building can be made in sections on or offsite and put together in a variety of configurations with minimal assembly. The A-frame building 100 can include access doors 105 for equipment installation, service, and replacement. The access doors 105 can be sufficiently large to permit passage of reactor system equipment and service equipment through the door openings.

The building 100 includes a ground surface 110 that defines a ground plane. The ground surface 110 can be, for example, a floor. The building 100 includes exterior side walls. The exterior side walls can be angled non-orthogonally relative to the ground surface 100. A first side wall, e.g., side 103, defines a plane at an acute angle 109 relative to the ground plane. A second side wall, e.g., side 104, defines a plane at an acute angle 111 relative to the ground plane. The side 103 has an interior wall 106. The side 104 has an interior wall 107. The side 103 has a top edge that meets with a top edge of the side 104 to form an apex 102. Thus, the sides 103 converge at a top of the building 100, and diverge at the ground surface 110 of the building 100.

The building 100 includes two end walls 112. The end walls 112 face each other on opposite sides of the building 100. Only one of the end walls 112 is depicted in FIG. 1. The sides 103, 104, and the end walls 112 define an interior volume of the building structure. The building 100 can include one or more nuclear reactor systems mounted at least partially in the interior volume of the building structure. The building 100 can include one or more heat exchanger systems mounted at least partially to at least one of the exterior walls and in thermal communication with the one or more nuclear reactor systems.

Figure 2:
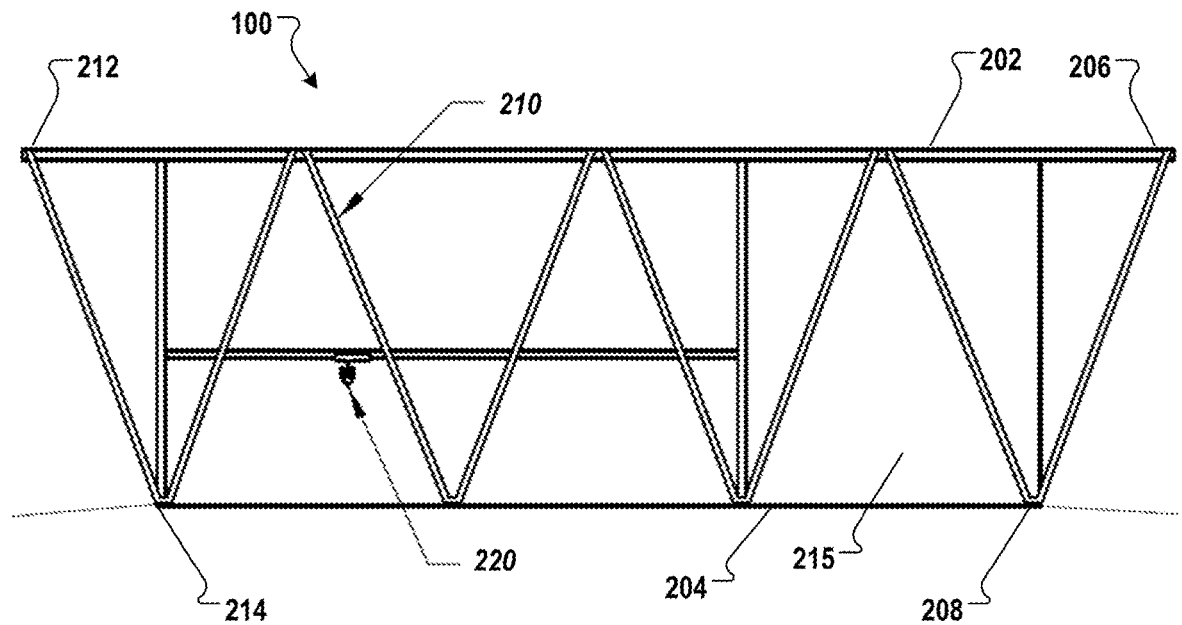
FIG. 2 shows a side cross-sectional view of an example A-frame building with A-frame beams and a crane.

FIG. 2 shows a side cross-sectional view of the example A-frame building 100 with A-frame beams 210 and a lifting assembly 220 positioned in an interior volume 215 of the building 100. An A-frame structure can support and accommodate one or more lifting assemblies including different kinds of cranes and internal equipment. For example, overhead cranes, gantry cranes, and jib cranes can all be supported though an A-frame design. The lifting assembly 220 can be used to lift and handle reactor system components.

An A-frame design can be structurally resilient against seismic events, roof loadings, and other internal and external forces due to its triangular shape. Precipitation such as rain, snow, and ice can be managed by the steep slopes of the sides of the A-frame. In some examples, the sides can overhang at the front and/or the rear of the building. The top edges of the sides can be longer than the bottom edges of the sides. For example, as shown in FIG. 2, top edge 202 is longer than bottom edge 204. Front upper corner 212 overhangs front lower corner 214, and rear upper corner 206 overhangs rear lower corner 208.

Figure 3:
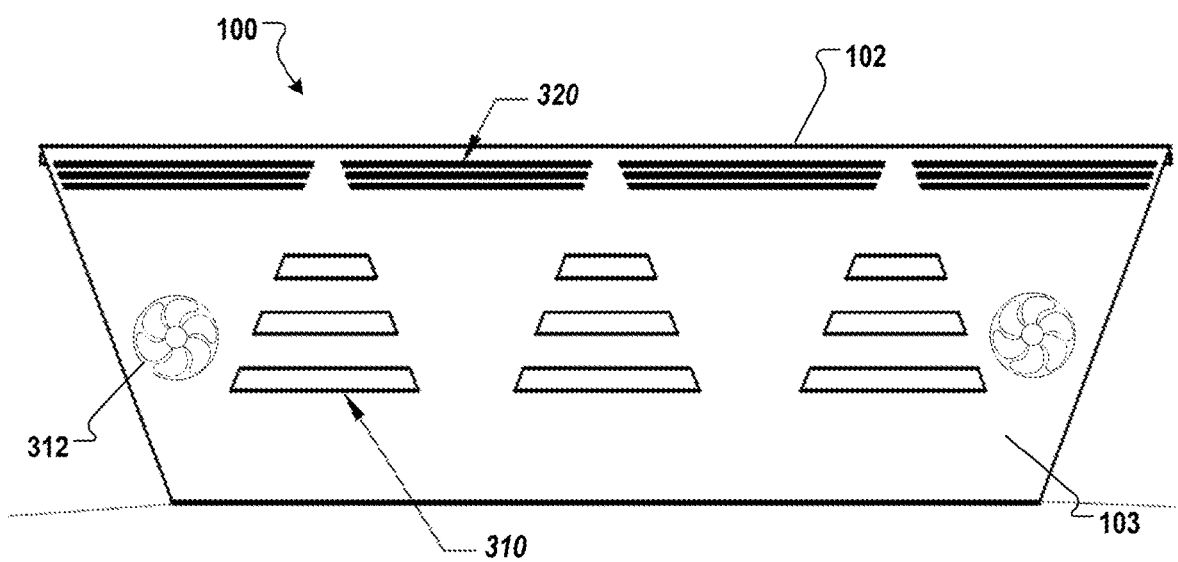
FIG. 3 shows a side view of an example A-frame building with solar panels and radiator panels.

FIG. 3 shows a side view of the example A-frame building 100 with solar panels 310 and radiator panels 320. A-frame sides can be advantageous for solar panels 310 and radiator panels 320. The sides can be angled for sunlight absorption and support a variety of solar panel system and heat removal system installations. For example, as shown in FIG. 3, the radiator panels 320 can be installed near the apex 102 of the building 100, and the solar panels 310 can be installed along the sides of the building, e.g., along the side 103. The building 100 can include fans 312 that can be used to force air flow from reactor systems toward the radiator panels 320.

Figure 4:
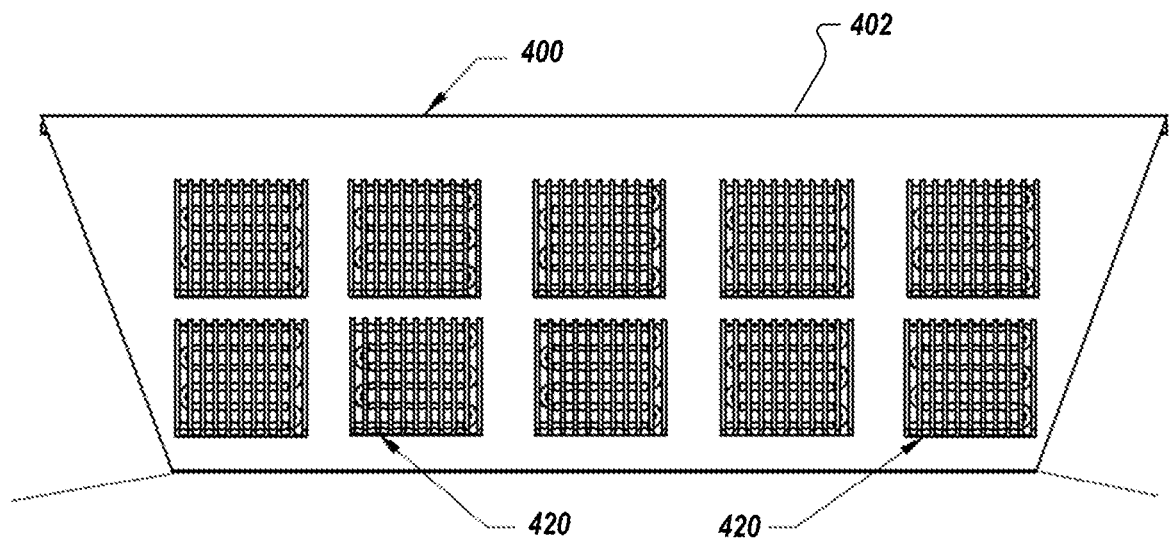
FIG. 4 shows a side view of an example A-frame building with radiator panels.
Figure 5:
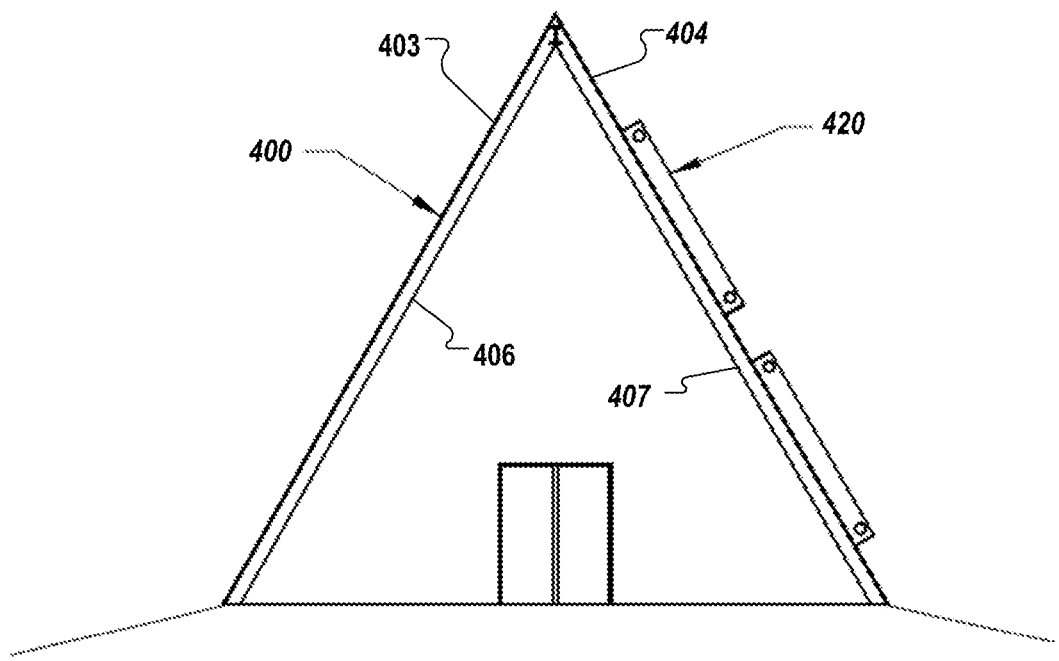
FIG. 5 shows a front view of an example A-frame building with radiator panels.

FIG. 4 shows a side view of an example A-frame building 400 with radiator panels 402. FIG. 5 shows a front view of the example A-frame building 400 with radiator panels 420. The sides 403, 404 can be used to support air cooled radiators or other forms of fluid cooled heat exchanger systems, such as plate and frame heat exchangers or heat pipes.

The radiator panels 420 are positioned on the outer surface of the building sides and reject unused or wasted heat from the reactor heat source, the power conversion system, or both. The radiator panels 420 can include air-cooled radiator tubes. Installing radiators on the sides 403, 404 of the A-frame building 400 enables plant design and configuration simplification, while also enhancing the aesthetics of the plant. The radiator panels 420 can benefit from the orientation afforded by the slope of the sides 403, 404, creating enhance draft patterns of air through the radiator to reject heat. Furthermore, the large surface area of the building 400 can be used to increase the overall heat transfer surface area of the radiators.

Additional enhancements can be made to the radiator panels 420 such as forced air flow cooling using fans 312 and surface modifications to radiator tubing and fins to enhance radiative heat transfer to the environment. For example, fans 312 can force air flow from reactor systems toward the radiators In some implementations, a control system (e.g., microprocessor based, electromechanical, mechanical, pneumatic, hydraulic, or otherwise) is communicably coupled to the radiator panels 420, or to other heat exchanger systems, to control the operations of the radiator panels 420, e.g., based on one or more sensed temperatures or pressures.

An A-frame structure can enhance heat transfer through natural convection. An A-frame design can enable directed airflow to transfer heat out of the building without additional fans or pumps. The shape and orientation of the building is designed to achieve enhanced heat removal capabilities. The less than 90-degree angle from the ground provides a flow path and heat exchange surface area to the outside air through the sides of the building along its entire length. Air in the building can be heated through operation of the reactor systems. Heated air in the building rises up in the middle of the building, impinges on the top apex, and transfers heat to the sides which transfer heat to air outside of the building. The air in the building then sinks downward along inside walls 406, 407 as the air cools down by transferring heat through the sides to the outside air. The inside air reaches the bottom of the building and flows along the floor to where the air can be reheated, creating a flow loop. The outside air correspondingly flows upwards along the building as the outside air heats up. The flow of air creates an open air draft loop that draws in cooler air to the sides as the warmer air rises.

The angles of the walls 406, 407 and sides 403, 404 support enhanced convection from the inside air to the sides 403, 404 because the angle allows buoyant warmer air to stay in contact with the walls. This effect is stronger near the top apex 402 of the building 400 where the air is warmest. The sloped angle can ensure and maintain thermal communication between the warmer air and the sides as the warmer air sinks along the sides, since the sinking air will still have greater buoyancy relative to the air at an average air temperature in the building.

In an example operation of the building 100, a nuclear power system including the building 100 can be operated to produce heat or electrical power. An example process can include operating a reactor system within the building 100 to generate heat, using heat to generate electrical power, and removing unused heat from the reactor using a heat exchanger system supported by the sides 403, 404 of the building 100. The process can also include removing unused heat by using fans to direct air within the interior volume 215 of the building 100 towards the apex 102 of the building 100.

In another example operation of the building 100, a nuclear power system including the building 100 can be operated to move components of a reactor system using the lifting assembly. An example process can include lifting, by the lifting assembly 220, a component of the reactor system, moving, by the lifting assembly 220 and within the interior volume 215, the component of the reactor system, and installing the component of the reactor system using the lifting assembly 220. In some examples, a process can include uninstalling a component of the reactor system using the lifting assembly 220, moving, within the interior volume 215, the component of the reactor system, and removing the component of the reactor system from the building 100 using the lifting assembly 220. In some examples, the process can include removing the component of the reactor system through the access doors 105 using the lifting assembly 220.

A nuclear reactor can include fuel including a fissile material such as uranium-233, uranium-235, or plutonium-239; a coolant or cooling device such as a heat pipe that uses alkali metals, halide salts, or other suitable working fluids that transports heat away from the fuel, a heat exchanger to transfer the heat from the coolant or cooling device to a power conversion system, as well as instrumentation, supporting structures and shielding.

In some implementations, a reactor that is part of a nuclear reactor vessel system is a fast reactor. A fast reactor is a reactor that generates energy through fission caused by fast neutrons. A traditional light water reactor, in contrast, generates energy through fission caused by thermal neutrons that are slowed by interaction with a water moderator. In a fast reactor, fast neutrons can cause fission in Uranium 238, the dominant isotope of Uranium. Fast neutrons can also cause fission in actinides, which are a by-product of thermal fission. Thus, fast reactors can generate energy from waste produced by light water reactors.

In some implementations, a reactor that is part of a nuclear reactor vessel system is an epithermal reactor. An epithermal reactor is a reactor that generates energy through fission caused by epithermal neutrons which have a higher average speed than thermal neutrons.

In some implementations, a reactor that is part of a nuclear reactor vessel system is a thermal reactor. A thermal reactor is a reactor that generates energy through fission caused by thermal, or slow, neutrons.

The fissile material can be contained in fuel cells. The fuel cells can be held inside a reactor module. The transfer of heat from the fuel to the heat exchanger through the heat pipe is accomplished by using the fuel in direct thermal communication with the heat pipe, or with one or more intermediate layers between fuel and heat pipe. The fuel can also be held in tubes, like cladding tubes, and the heat is transferred to a coolant. The coolant or heat pipe carries heat to a heat exchanger where the coolant transfers its heat to another coolant or working fluid. These structures can be supported and contained, at least partially, in a vessel, or vessel-like structure (e.g., an "inner vessel"). In some implementations, the reactor module can be modular, e.g., the reactor module can be insertable and removable from the inner vessel. The inner vessel, including the enclosed reactor module, can be supported and contained, at least partially inside another vessel, or vessel-like structure (e.g., an "outer vessel"). In some implementations, the inner vessel can be modular, e.g., the inner vessel can be insertable and removable from the outer vessel.

Figure 6A:
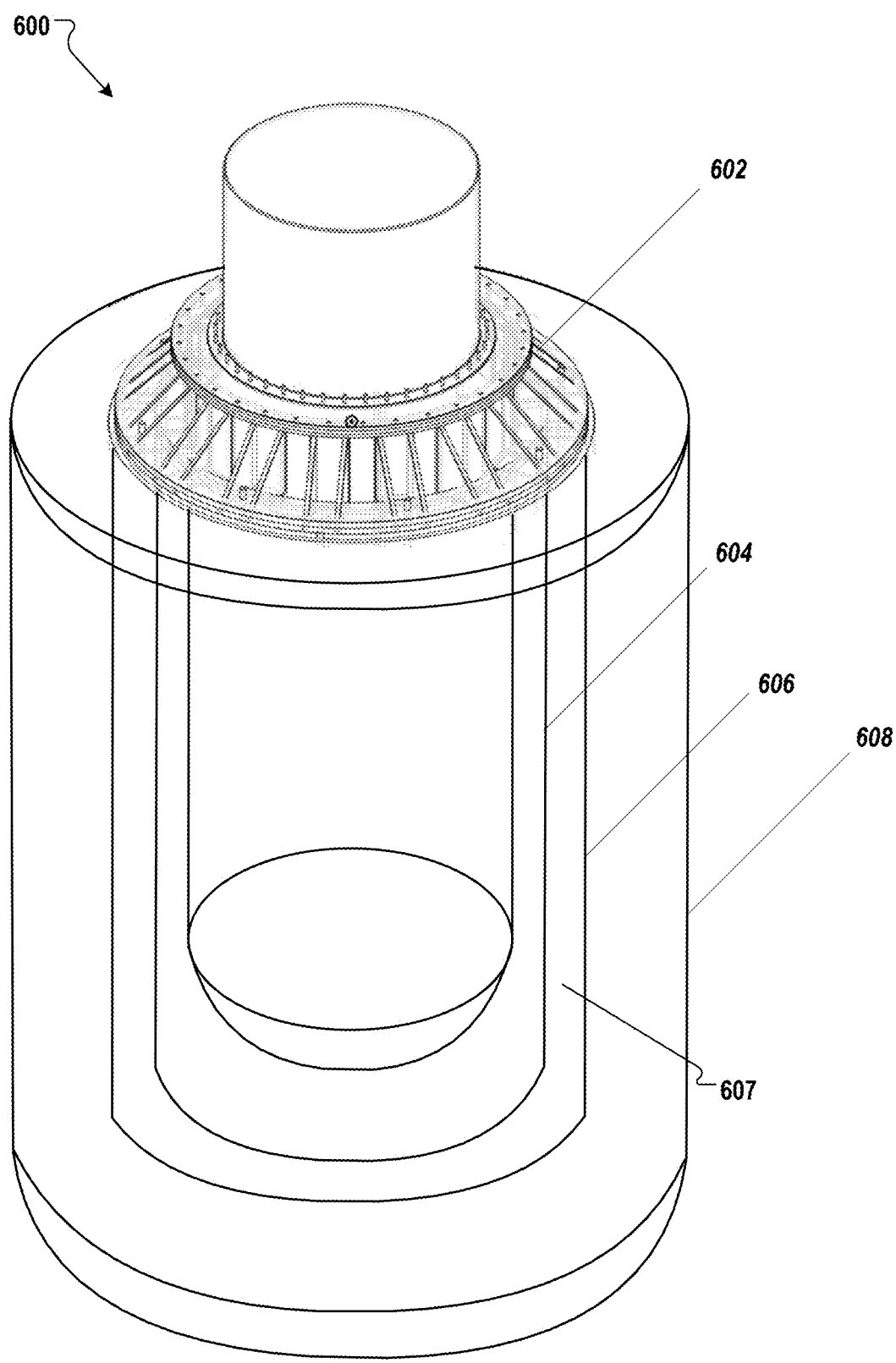
FIG. 6A is an isometric schematic illustration of an example implementation of a nuclear reactor vessel system according to the present disclosure.

FIG. 6A is an isometric schematic illustration of an example implementation of a nuclear reactor vessel system 600. In this example, the nuclear reactor vessel system includes at least two nested vessels. The nested vessels include an inner vessel 604 nested wholly or substantially within an outer vessel 606. The inner vessel 604 and the outer vessel 606 can each have an approximately cylindrical shape, with a radius of the outer vessel 606 being greater than a radius of the inner vessel 604. A support plate 602 is mounted to atop of the nested vessels. The support plate 602 has an approximately circular shape. A radius of the support plate 602 can be at least as long as the radius of the outer vessel 606. A support structure 608 is shown surrounding the nested vessels. The support structure 608 can have an approximately cylindrical shape, with a radius of the support structure 608 being greater than the radius of the outer vessel 606.

Figure 6B:
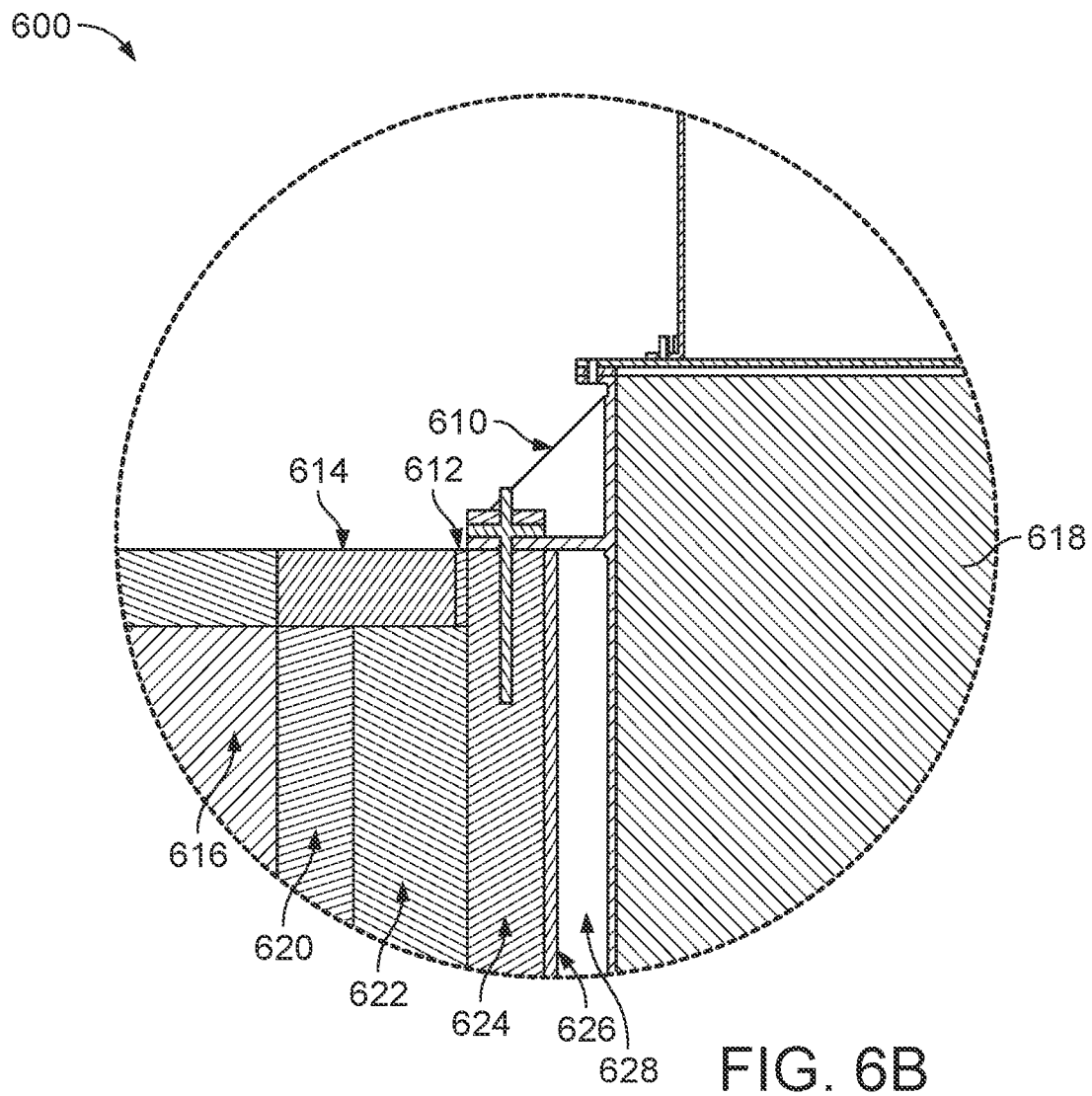
FIG. 6B is a schematic illustration of a detail of the example implementation of the nuclear reactor vessel system of FIG. 6A emplaced into a structure.

FIG. 6B is a schematic illustration of a detail of the example implementation of the nuclear reactor vessel system 600 of FIG. 6A emplaced into the support structure 608. Specifically, FIG. 6B shows an illustration of a top portion of the nuclear reactor vessel system 600 mounted to and within the support structure 608. In this example, the support structure 608 includes a foundation 620, engineered backfill 622, and concrete emplacement 624 formed in the ground 616, as or as part of a building structure 100. An expansion joint 612 separates the concrete emplacement 624 from a floor 614, e.g., of the building structure 100. A module support 610 couples nested vessels 618 to the concrete emplacement 624, thereby leaving a cavity 628 (or annulus) between the nested vessels 618 and the concrete emplacement 624. In some implementations, insulation 626 is placed in the cavity 628 between the concrete emplacement 624 and the nested vessels 618.

Figure 7B:
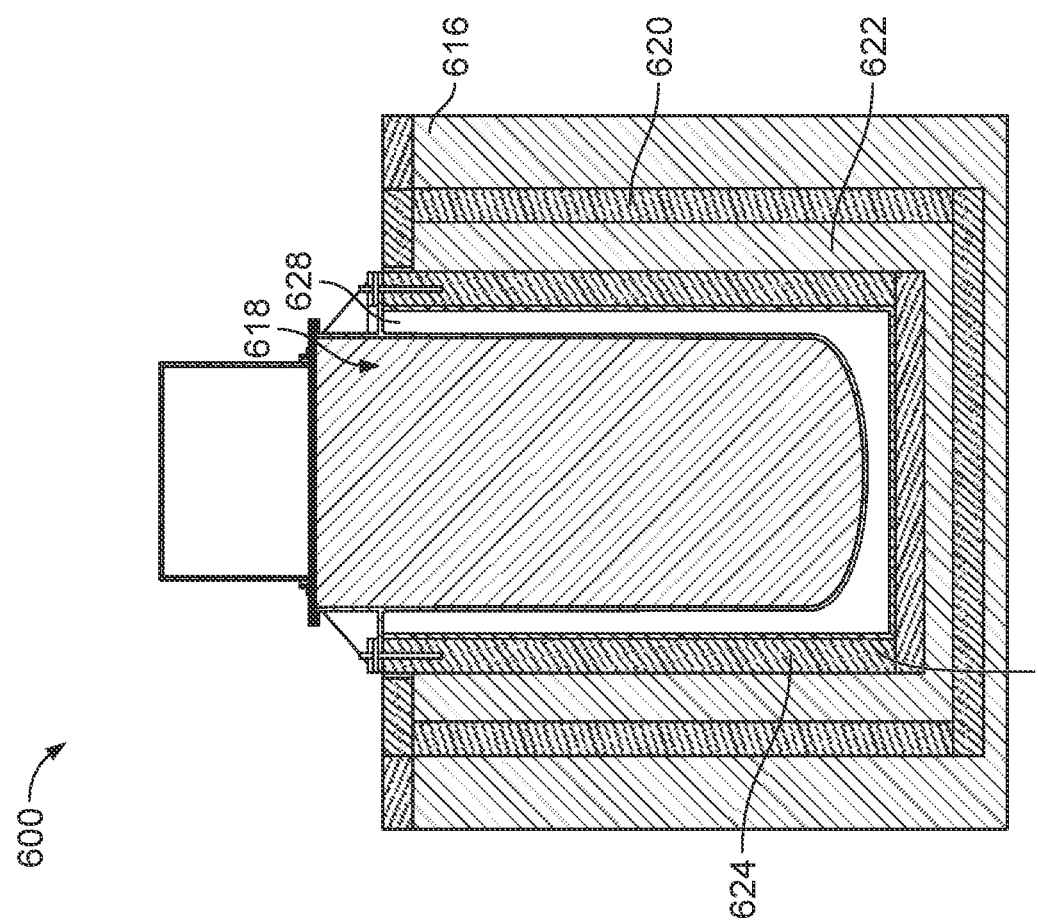
FIG. 7B is a cross-section view along the line "A-A" shown in FIG. 7A.
Figure 7A:
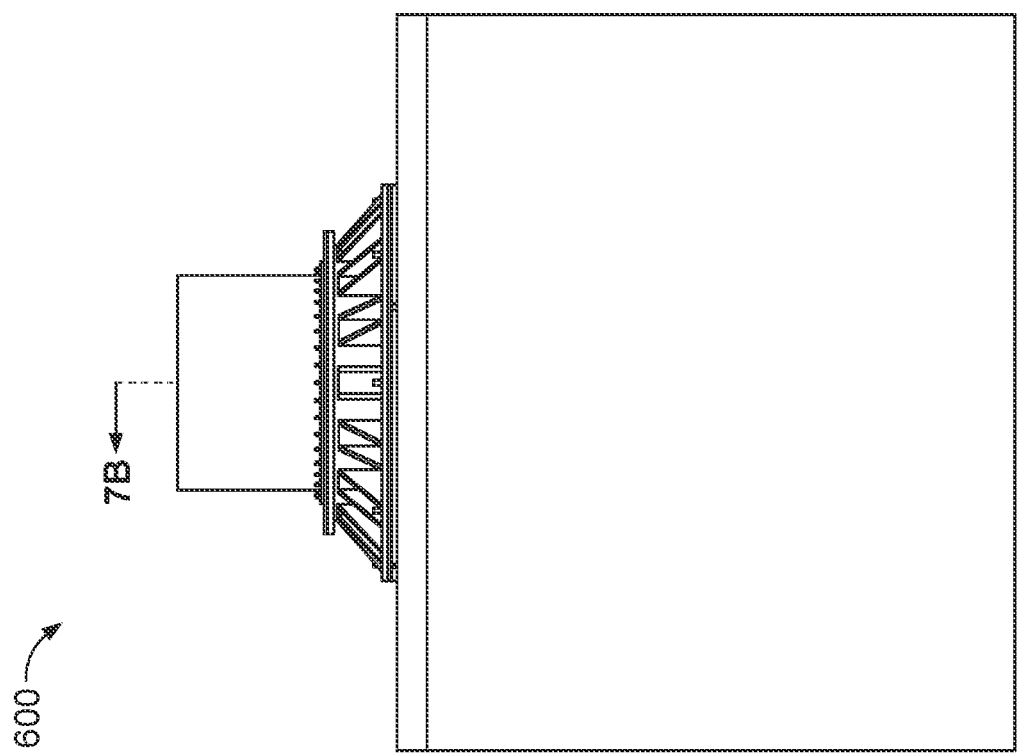
FIG. 7A is a side schematic illustration of the example implementation of the nuclear reactor vessel system of FIG. 6A according to the present disclosure.

Similar components as shown in FIG. 6B are also shown in FIGS. 7A-7B. FIG. 7A is a side schematic illustration of the example implementation of the nuclear reactor vessel system of FIG. 6A according to the present disclosure. FIG. 7B is a cross-section view along the line "A-A" shown in FIG. 7A. The nested vessels 618 can provide structural support, configuration flexibility to accommodate other materials and structures, and multiple barriers to the leakage of materials contained within the structures, such as gases and liquids (e.g., radioactive fluids). The nested vessels 618 can also enable a variety of physical mounting, suspension, and support designs. These can include mounting the nested vessels 618 on steel or a reinforced concrete emplacement 624, which can resemble a silo. In some aspects, the nested vessels 618 can be oriented vertically (e.g., with a long axis of the vessels orthogonal to a support surface on which they are placed). Alternatively, the nested vessels 618 can be oriented horizontally (e.g., with a long axis of the vessels parallel to a support surface on which they are placed) to reduce height requirements, or to simplify positioning.

The cavity 628 (e.g., cavity or annulus) between the outer vessel 606 and concrete emplacement 624 can be present to allow for passive heat removal via radiation or natural convection off the surface of the outer steel container. The cavity 628 can also be filled with other fluids or solids to support achieving adequate heat transfer. Examples can include water, sand, or other porous medium. The emplacement for the nested vessels and structures (such as the support structure) can be located in or as part of a reactor building, including in the basement of the building, or can be located above grade.

The nested vessels 618 can also be configured in such a way that the nested vessels 618 including the inner vessel 604 and outer vessel 606 are modular and can be removable. For example, the nested vessels 618 can be removable from the concrete emplacement. In some examples, the inner vessel 604 can be removable from the outer vessel 606. Modularity and removability of the nested vessels 618 can allow for repairs or replacement of major components of the reactor vessel system 600.

Equipment and machinery that supports reactor operations and control, such as the motors and gears that move reactor control elements can be positioned above or next to these containers. This equipment can also be housed in an external housing structure.

Figure 7C:
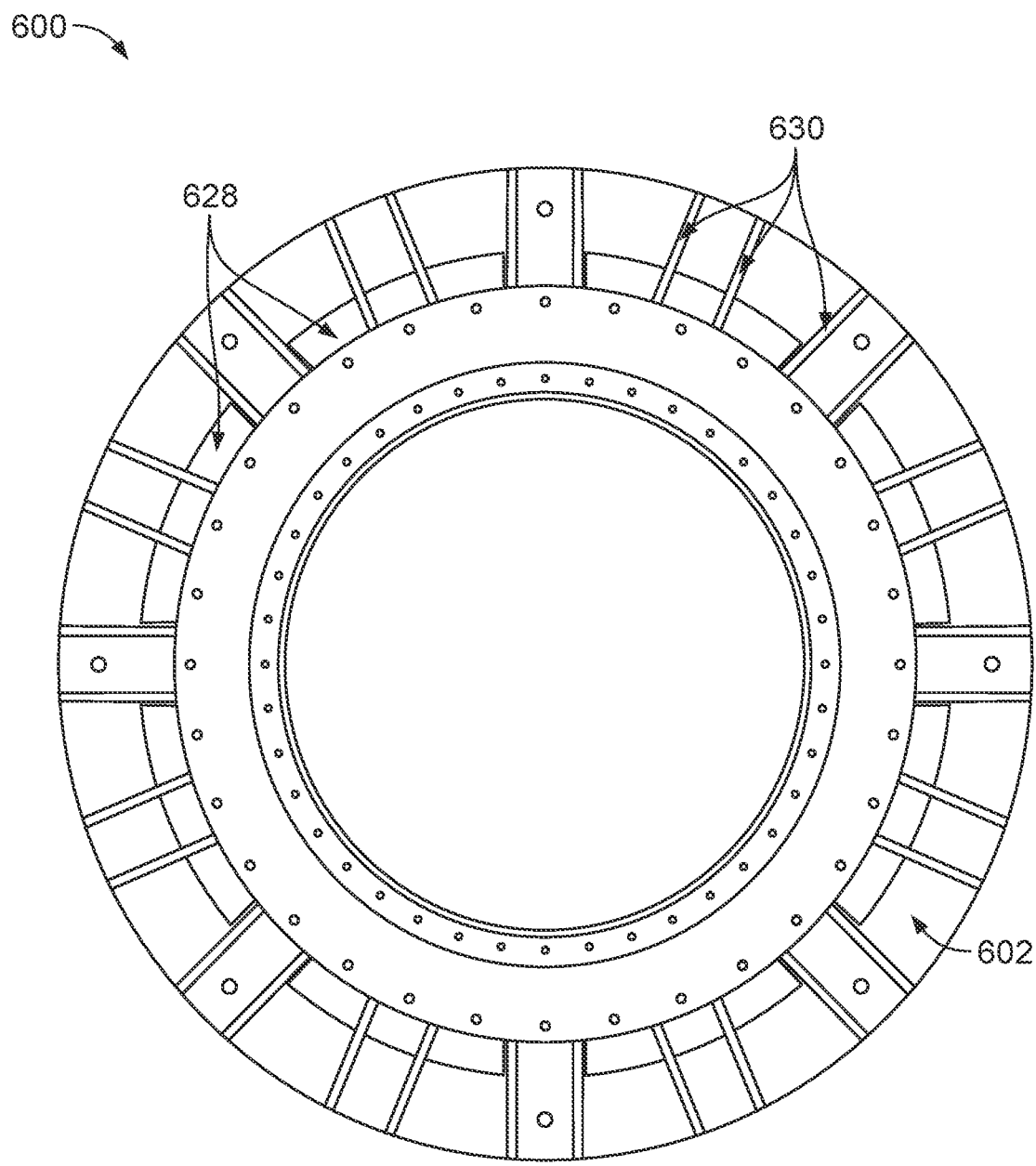
FIG. 7C is a top schematic illustration of the example implementation of the nuclear reactor vessel system of FIG. 6A according to the present disclosure.

FIG. 7C is a top schematic illustration of the example implementation of the nuclear reactor vessel system 600 of FIG. 6A according to the present disclosure. Generally, the outer vessel 606 can be sized to accommodate the inner vessel 604 (e.g., wholly or substantially). The outer vessel 606 of the nested vessels 618 can be sized to accommodate other structures, such as reinforcing structures, shielding 607, detectors, structures that enhance heat transport, among other structures. For example, as shown in FIG. 7C, support gussets 630 can be placed to couple the nested vessels with the support structure across the cavity 628.

Figure 8A:
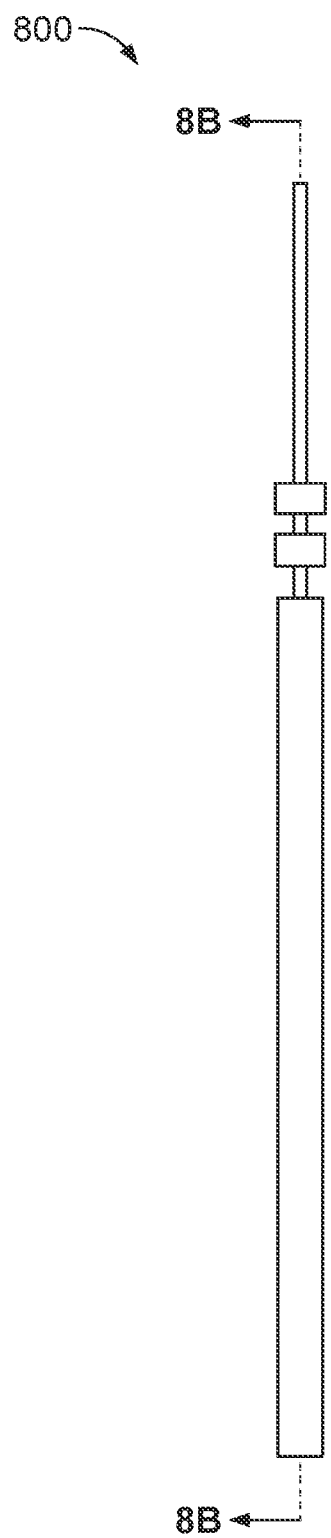
FIG. 8A is a side schematic illustration of an example implementation of a reactor shutdown rod and motor assembly according to the present disclosure.
Figure 8B:
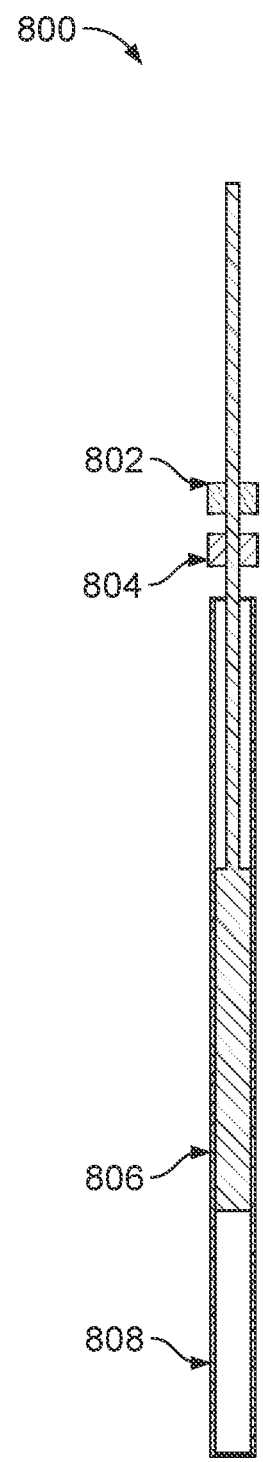
FIG. 8B is a cross-section view along the line "A-A" shown in FIG. 8A.

FIGS. 8A-8B illustrate example implementations of a reactor control element 800 including a reactor shutdown rod and motor assembly. FIG. 8A is a side schematic illustration of an example implementation of a reactor shutdown rod and motor assembly according to the present disclosure. FIG. 8B is a cross-section view along the line "A-A" shown in FIG. 8A.

The reactor control element 800, for example, includes one or more control rods 806 containing neutron absorbing materials that are moved into or out of the reactor core (e.g., of the fast reactor) by one or more motors in order to achieve a desired control function. The control rod 806 can be inserted along a number of orientations with the reactor, including parallel or perpendicular to cooling flow paths. The reactor control element 800 can also include embedded cooling mechanisms, such as heat pipes. The control rod 806 can be driven by a motor assembly. The motor can include a drive mechanism 804 including a gearbox, and an electromagnetic latch 802. In some implementations, the control rod 806 can insert by gravity alone. The rods can also have guided slots or dedicated channels, such as a sleeve 808, to add structural integrity. The reactor control element 800, as well as the structures containing the reactor control element, can be configured to enable modular replacement of components or whole systems and structures.

The illustrated reactor shutdown rod and motor assembly can also support the modular flexibility of structures or systems in the reactor core, including fuel elements, heat exchangers, support structures, and cooling structures or devices, such as heat pipes. This can enable increased modularity by employing designs or design features that allow the cooling mechanisms to be removed from the fuel. In some instances, the heat pipes can be removable from the fuel.

Figure 9:
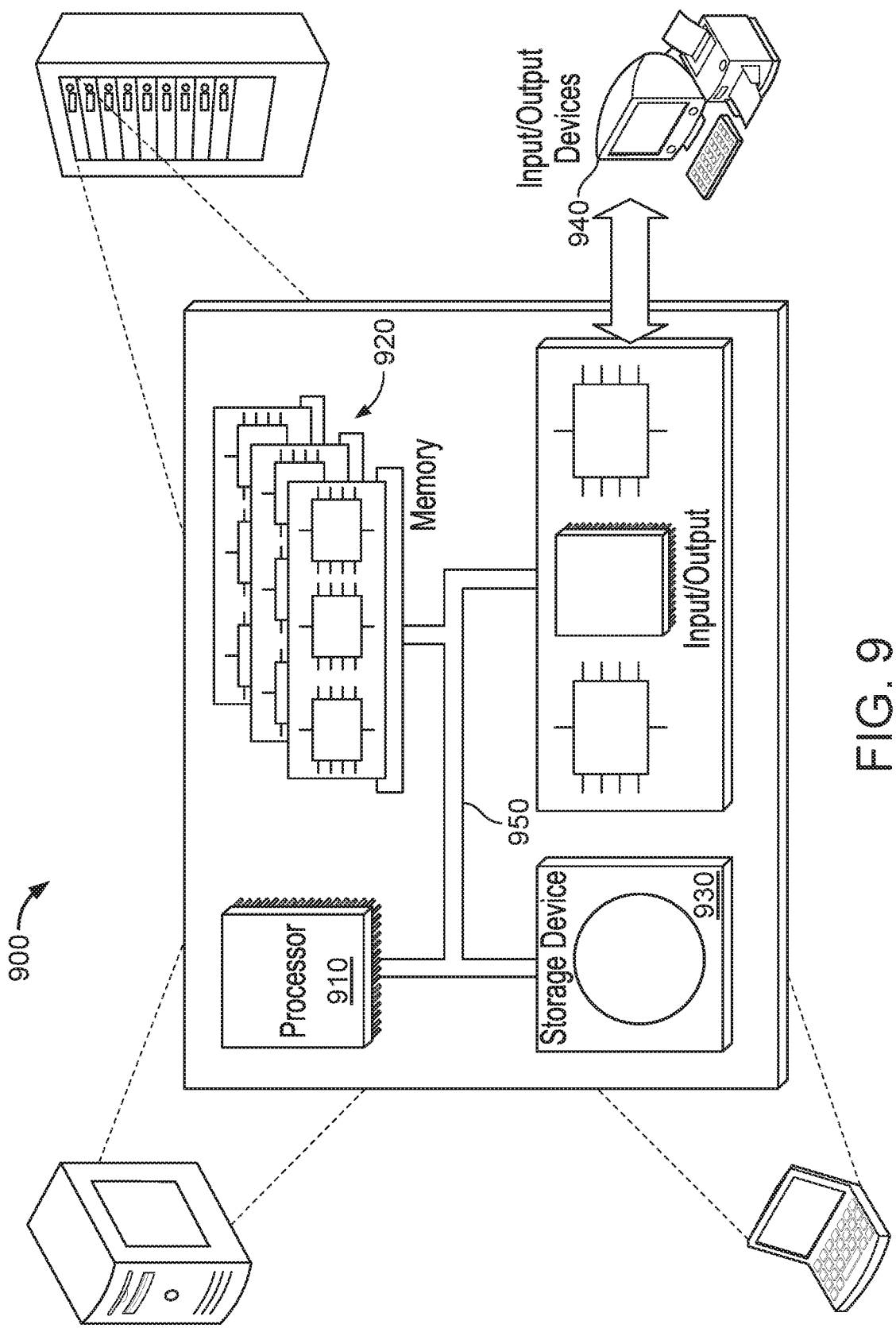
FIG. 9 shows a schematic diagram of a computer system.

FIG. 9 is a schematic diagram of a computer system 900. The system 900 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 900) and their structural equivalents, or in combinations of one or more of them. The system 900 is intended to include various forms of digital computers, such as laptops, desktops, workstations, personal digital assistants, servers, blade servers, mainframes, and other appropriate computers, including vehicles installed on base units or pod units of modular vehicles. The system 900 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, a tape device, or a solid state device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A nuclear power system, comprising:
one or more nuclear reactor systems; and
an air cooling system comprising:
a building structure that comprises at least two exterior side walls and two end walls, at least one of the exterior side walls angled non-orthogonally relative to a floor of the building structure, the at least two exterior side walls configured to converge at a top apex of the building structure and diverge at the floor of the building structure, the at least two exterior side walls and two end walls defining an interior volume of the building structure, the one or more nuclear reactor systems mounted at least partially in the interior volume of the building structure;

one or more fluid-cooled heat exchanger systems mounted at least partially to at least one of the exterior side walls and in thermal communication with the one or more nuclear reactor systems; and an airflow path defined within the building structure and configured to circulate air within the interior volume of the building structure from the one or more nuclear reactor systems towards the top apex of the building structure and downward along an interior surface of the at least one of the exterior side walls to transfer heat from the air to an environment external to the building structure through the one or more fluid-cooled heat exchanger systems.

2. The nuclear power system of claim 1, wherein all of the at least two exterior side walls are angled non-orthogonally relative to the floor of the building structure.

3. The nuclear power system of claim 2, wherein each of the at least two exterior side walls define a plane at an acute angle relative to the floor.

4. The nuclear power system of claim 2, wherein edges of the at least two exterior side walls at the top of the building structure are longer than edges of the at least two exterior side walls at the floor of the building structure.

5. The nuclear power system of claim 1, wherein the one or more fluid-cooled heat exchanger systems comprise one or more air-cooled radiator systems and one or more fans positioned to circulate air heated by the one or more nuclear reactor systems toward the one or more air-cooled radiator systems.

6. The nuclear power system of claim 1, further comprising a control system communicably coupled to at least one of the one or more fluid-cooled heat exchanger systems or the one or more nuclear reactor systems.

7. The nuclear power system of claim 6, wherein the control system is configured to operate at least one of the one or more fluid-cooled heat exchanger systems or the one or more nuclear reactor systems to modulate an amount of heat transferred from the one or more nuclear reactor systems to the one or more fluid-cooled heat exchanger systems.

8. The nuclear power system of claim 1, further comprising a solar panel system installed on one or more of the at least two exterior side walls, the solar panel system configured to generate electrical power for the one or more nuclear reactor systems.

9. The nuclear power system of claim 1, further comprising a plurality of beams positioned to support the at least two exterior side walls, wherein the beams are configured to further support lifting equipment.

10. The nuclear power system of claim 1, wherein at least one of the one or more nuclear reactor systems mounted at least partially in the interior volume of the building structure comprises:

a nuclear fission reactor that comprises at least one of a fast reactor, an epithermal reactor, or a thermal reactor;

an inner vessel that defines an inner volume sized to at least partially enclose the nuclear fission reactor; and an outer vessel sized to wholly or substantially enclose the inner vessel, the inner vessel being removable from the outer vessel.

11. The nuclear power system of claim 10, wherein the nuclear fission reactor is removable from the inner vessel.

12. The nuclear power system of claim 10, wherein the nuclear fission reactor comprises a plurality of nuclear fuel elements, and the plurality of nuclear fuel elements are cooled by a fluid coolant in thermal communication with the nuclear fuel elements and the one or more fluid-cooled heat exchanger systems.

13. The nuclear power system of claim 10, wherein the at least one nuclear reactor system comprises radiation shielding positioned in an annulus between the inner and outer vessels.

14. The nuclear power system of claim 10, wherein at least one of the inner vessel or the outer vessel is configured to couple to a portion of the building structure, and the building structure further comprises an insulation layer positioned in a gap between a concrete emplacement and the outer vessel.

15. The nuclear power system of claim 10, wherein the at least one nuclear reactor system comprises at least one reactor control assembly mounted within the inner vessel, the at least one reactor control assembly comprising a motor assembly coupled to a control rod comprising a neutron absorbing material, the motor assembly comprises at least one electromagnet and at least one drive mechanism.

16. The nuclear power system of claim 10, wherein the at least one of the one or more nuclear reactor systems comprises one or more support gussets configured to couple the inner vessel to the outer vessel across a cavity between the inner vessel and the outer vessel.

17. The nuclear power system of claim 1, wherein the one or more fluid-cooled heat exchanger systems comprise one or more radiator panels.

18. The nuclear power system of claim 17, comprising one or more solar panels mounted to one or more of the at least two exterior side walls.

19. The nuclear power system of claim 18, wherein the one or more radiator panels are positioned closer to the top apex than the one or more solar panels.

20. The nuclear power system of claim 1, wherein the airflow path is further configured to circulate air from the interior surface of the at least one of the exterior side walls along the floor of the building structure towards the middle of the building structure.

21. The nuclear power system of claim 2, wherein the at least two exterior side walls comprise only two exterior side walls.

22. The nuclear power system of claim 21, wherein each of the two exterior side walls defines a plane at an acute angle relative to the floor of the building structure.

* * * * *